United States Patent
Lu et al.

(10) Patent No.: US 8,171,749 B2
(45) Date of Patent: May 8, 2012

(54) ULTRA SMALL AIR CHILLER FOR AIRCRAFT GALLEY

(75) Inventors: Qiao Lu, Placentia, CA (US); Timothy Andrew Birkmann, Corona, CA (US); Shon Mattly, Tustin, CA (US); Steven Whisler, San Juan Capistrano, CA (US); Richard Rizzo, Burbank, CA (US); Michael E. Wright, Corona, CA (US); Edward Bates, Anaheim, CA (US)

(73) Assignee: B/E Aerospace, Inc., Wellington, FL (US)

( * ) Notice: Subject to any disclaimer, the term of this patent is extended or adjusted under 35 U.S.C. 154(b) by 724 days.

(21) Appl. No.: 12/260,442

(22) Filed: Oct. 29, 2008

(65) Prior Publication Data

US 2009/0107163 A1 Apr. 30, 2009

Related U.S. Application Data

(60) Provisional application No. 60/984,016, filed on Oct. 31, 2007.

(51) Int. Cl.
*F25D 21/14* (2006.01)
(52) U.S. Cl. ......................................................... 62/291
(58) Field of Classification Search .................... 62/291, 62/285, 272
See application file for complete search history.

(56) References Cited

U.S. PATENT DOCUMENTS

| 4,182,131 | A | * | 1/1980 | Marshall et al. .................. 62/91 |
| 4,637,225 | A | * | 1/1987 | Marshall et al. ................. 62/285 |
| 5,461,879 | A | | 10/1995 | Bolton et al. |
| 7,013,658 | B2 | | 3/2006 | Dobmeier et al. |
| 7,721,787 | B2 | * | 5/2010 | Barnwell ...................... 165/11.1 |
| 2005/0172654 | A1 | | 8/2005 | Rohrer et al. |
| 2006/0150666 | A1 | | 7/2006 | Rini et al. |
| 2008/0196442 | A1 | | 8/2008 | Lu |

* cited by examiner

*Primary Examiner* — Melvin Jones
(74) *Attorney, Agent, or Firm* — Drinker Biddle & Reath LLP

(57) ABSTRACT

An aircraft-galley chiller, enclosed in a housing, including an evaporator condensate drying device. The galley chiller may operate on DC power and may be transported from one cart to another to provide chilled air to a particular cart.

20 Claims, 4 Drawing Sheets

ULTRA SMALL AIR CHILLER FOR AIRCRAFT GALLEY

PRIOR RELATED APPLICATIONS

This application claims priority to U.S. provisional patent application No. 60/984,016, filed Oct. 31, 2007, which is incorporated in its entirety herein by reference.

FIELD OF THE INVENTION

This invention pertains to refrigeration equipment, more specifically, to equipment for providing and re-circulating chilled air to an aircraft galley food service system.

BACKGROUND OF THE INVENTION

Conventional air chillers used with aircraft and other galley food service systems are designed such that when a small portion of the galley or an individual cart needs cooling, the entire cooling system needs to be operated. This results in a greater consumption of energy than is necessary.

Existing chillers that are currently in use in aircraft galleys are relatively large and AC powered. Because of the size of these chillers, they are currently in use only on large commercial aircraft. These commercial aircraft may have three or more galleys which store eight to ten galley carts. If the single large chiller is not operating, there is no cooling provided to the particular galley food system. Conversely, even if an operator desires to cool just one of several galley carts in an aircraft galley, all of the carts are subjected to the cool air of the chiller.

Given the size and weight of the existing chillers, the galleys in smaller aircraft such as general aviation or business jet aircraft do not have sufficient space in which to install chillers. As a result, these aircraft do not have the capability to maintain food at a temperature cooler than the cabin temperature. Furthermore, if AC power is not available, existing chillers cannot provide cooling to an aircraft's galley food system.

Given the size and weight of current aircraft galley chillers, a smaller lighter chiller that could be used in smaller business and general aviation aircraft as well as inside an individual galley cart would be an important improvement in the art. Furthermore, an aircraft chiller capable of operating on DC power would be an improvement in the art.

BRIEF SUMMARY OF THE INVENTION

The invention involves an aircraft galley chiller that is designed as a chiller for a single galley cart or an insulated enclosure, e.g., a refrigerated compartment. The inventive chiller can be installed behind a galley wall, inside a single cart, or outside of the cart. The chiller, which is suitable for any aircraft platform operates off of a DC power supply and includes a moisture drying device to accommodate condensate from the evaporator. In an embodiment, the condensate is contacted with a liquid refrigerant tube which is a high temperature and pressure line. The condensate cools the liquid refrigerant and is vaporized due to the heat from the refrigerant line.

BRIEF DESCRIPTION OF THE DRAWINGS

Exemplary embodiment of the invention described herein are shown in the attached drawings. It is understood, however, that the invention is not limited to the precise arrangements and constructions particularly shown. In the drawings.

DETAILED DESCRIPTION OF THE DRAWINGS

The exemplary embodiments of the invention described herein relate to an ultra small air chiller. The chiller in these embodiment is used to cool an enclosure that is small and/or portable. The chiller includes an air-cooled condenser, a compressor, a condenser fan, an evaporator fan, and their respective motors. A rear panel is removably attached to the housing to allow for easy access to maintain and replace chiller components as needed. The chiller also includes an evaporator condensate drying device. The chiller also preferably includes a control system, which may be any type of suitable refrigeration control system. More preferably, the control system is an electrical control system, including sensors, switches, and a microprocessor.

Figure 1:
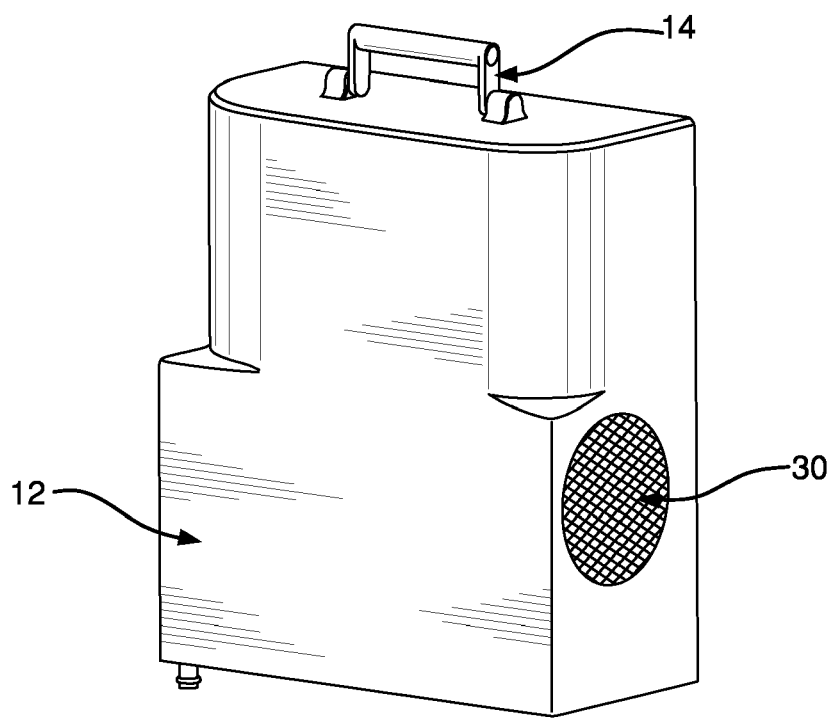
FIG. 1 is an isometric view of the front of an embodiment of the chiller of the present invention.
Figure 2:
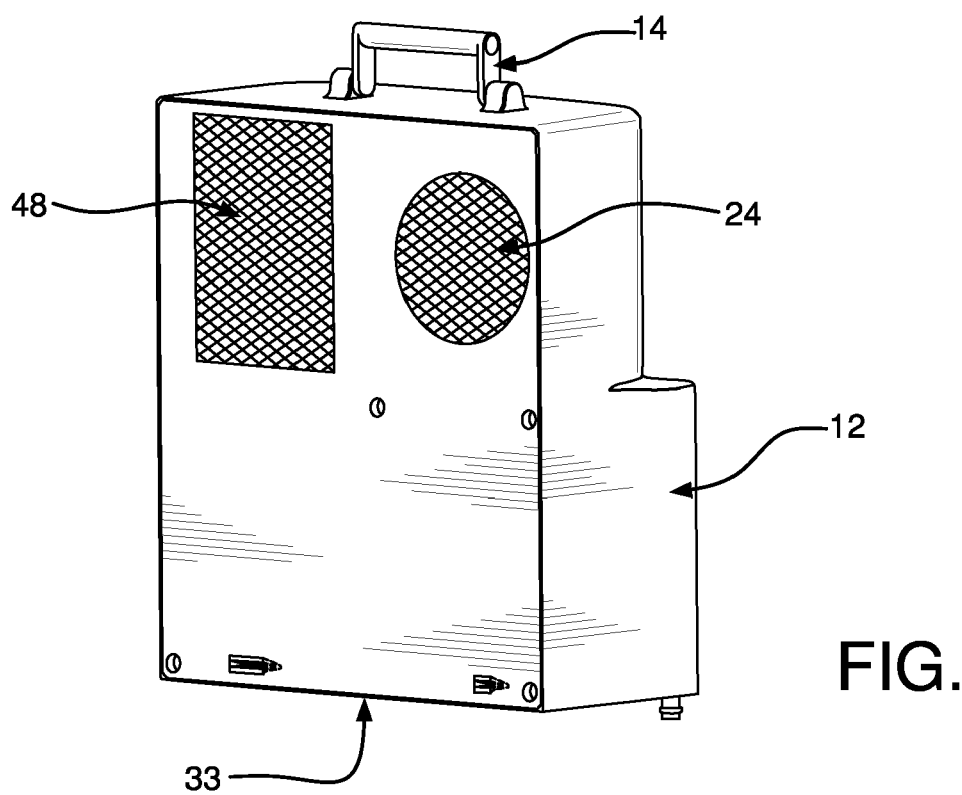
FIG. 2 is an isometric view of the rear of the chiller of FIG. 1.
Figure 3:
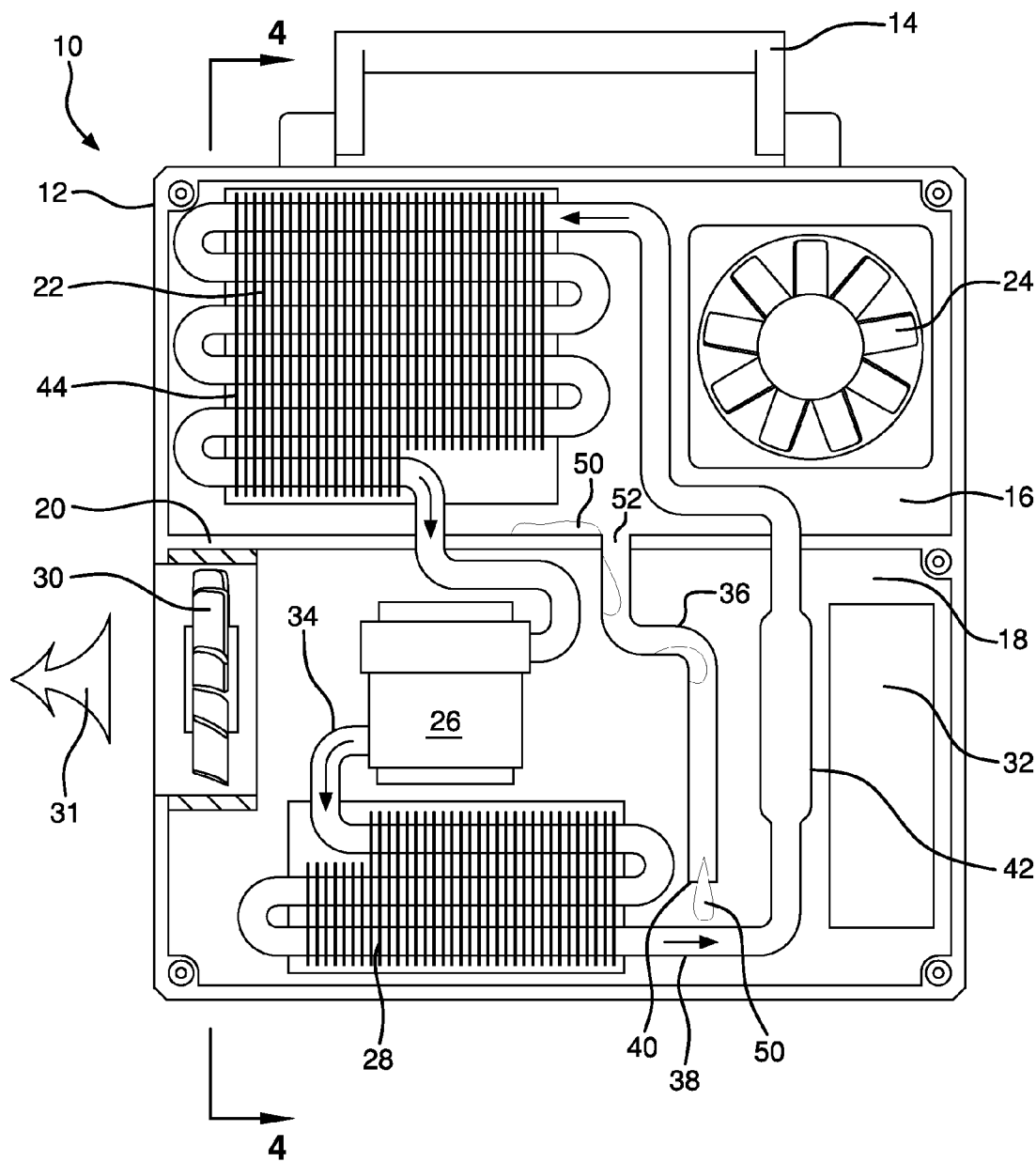
FIG. 3 is a rear view of the components of the chiller of FIG. 1.

FIG. 3 shows a cut-away view of an embodiment of the chiller of the present invention. The chiller 10 includes a housing 12, which preferably includes a handle 14 attached to the housing 12 to allow for ease in carrying the chiller 10, as shown in FIGS. 1 and 2. The housing is preferably made from a lightweight and strong material, such as plastic. The housing is preferably divided into a first chamber 16 and second chamber 18 by divider 20. In a preferred embodiment, the first chamber 16 is located above the second chamber 18; however, the chambers may be placed in any desired orientation. The housing 12 is sized to accommodate refrigeration system components therein. In a preferred embodiment, the housing is approximately 12 inches in height, has a width of approximately 10 inches, and has a depth of approximately 4 inches. More preferably, the housing is less than 10 inches wide and less than 4 inches deep.

Figure 4:
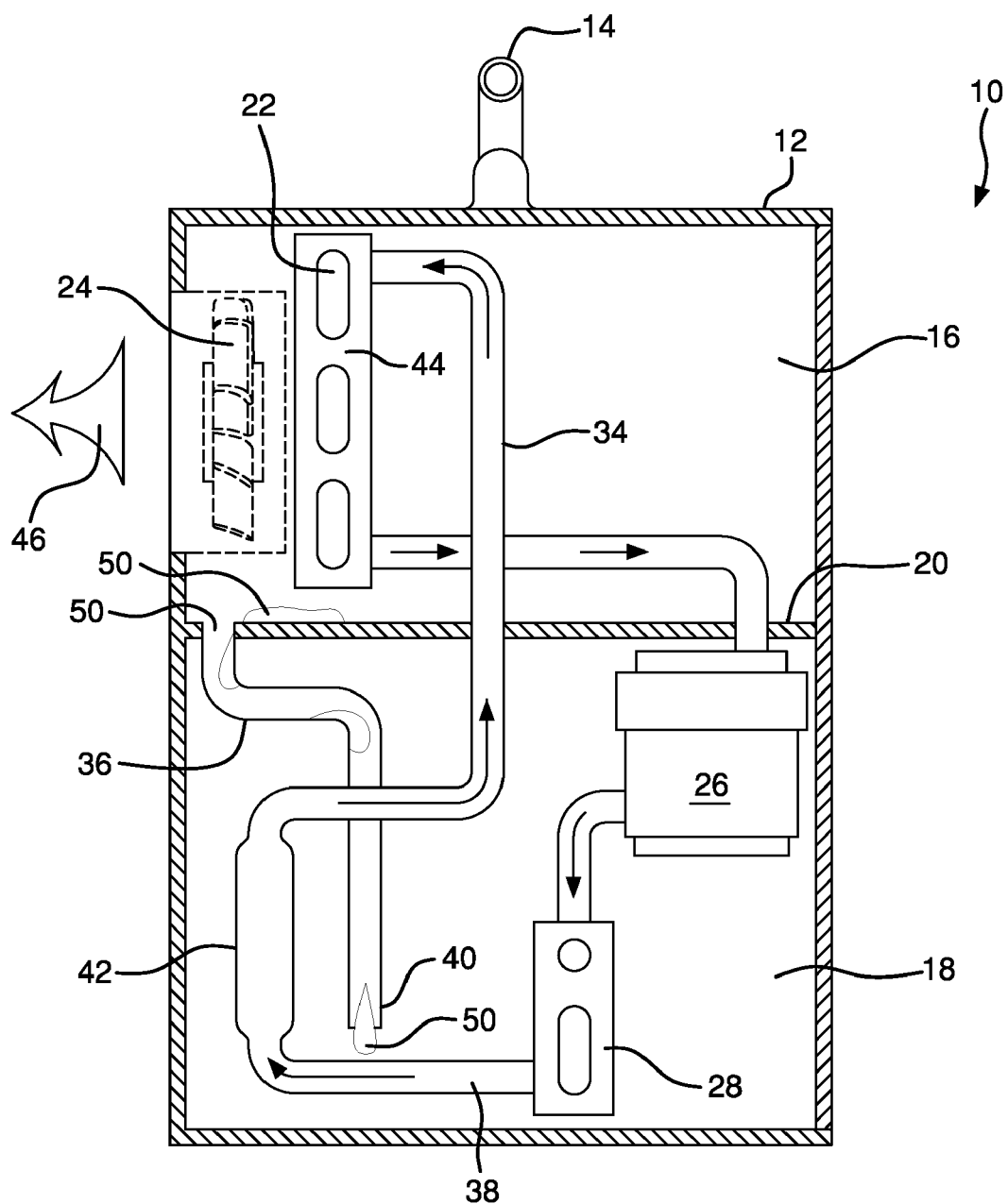
FIG. 4 is a side view of the components of the chiller of FIG. 3, seen along line 4-4.

As shown in FIGS. 3 and 4, the housing first chamber contains evaporator 22 and an evaporator fan 24. The second chamber contains compressor 26, condenser 28, and a condenser fan 30. The housing may also contain a control module 32. In a preferred embodiment, the control module is electronic and includes a feedback control system such that the chiller 10 may automatically maintain a prescribed temperature in the chiller's immediate area. Evaporator 22, compressor 26, and condenser 28 are connected by refrigerant tubing 34, which contains the refrigerant (not visible) and allows the refrigerant to move between the components over the course of the refrigeration cycle. The refrigerant is preferably R-134a, but may be any suitable refrigerant without departing from the scope and spirit of the invention.

The divider 20 creates a seal between chambers 16 and 18, and prevents fluid or hot or cold air from moving between the chambers except as provided through refrigerant tubing 34 or condensate drain tube 36.

Referring now to FIG. 3, the operation of the chiller 10 will now be described. As refrigerant in vapor form is compressed in the compressor 26, the temperature and pressure of the refrigerant rise significantly. Upon exiting the compressor, the refrigerant, in superheated vapor form, moves through the tubing 34 toward the condenser 28, in which the refrigerant is condensed into a saturated liquid. The condenser 28 is preferably air-cooled by use of condenser fan 30, which exhausts condenser air 31. The housing 12 may also include one or more condenser vents 33 to allow fresh air to enter the second chamber 18 to cool the condenser, as shown in FIG. 2. While an air-cooled condenser is preferred, a fluid-cooled condenser may also be used. Upon exiting the condenser 28, the refrigerant passes through high-temperature/high-pressure area 38 of the tubing 34. The high-temperature/high-pressure section 38 passes proximate the exit 40 of condensate drain tube 36. As shown in FIGS. 3 and 4, the section 38 passes under the exit 40.

Figure 5:
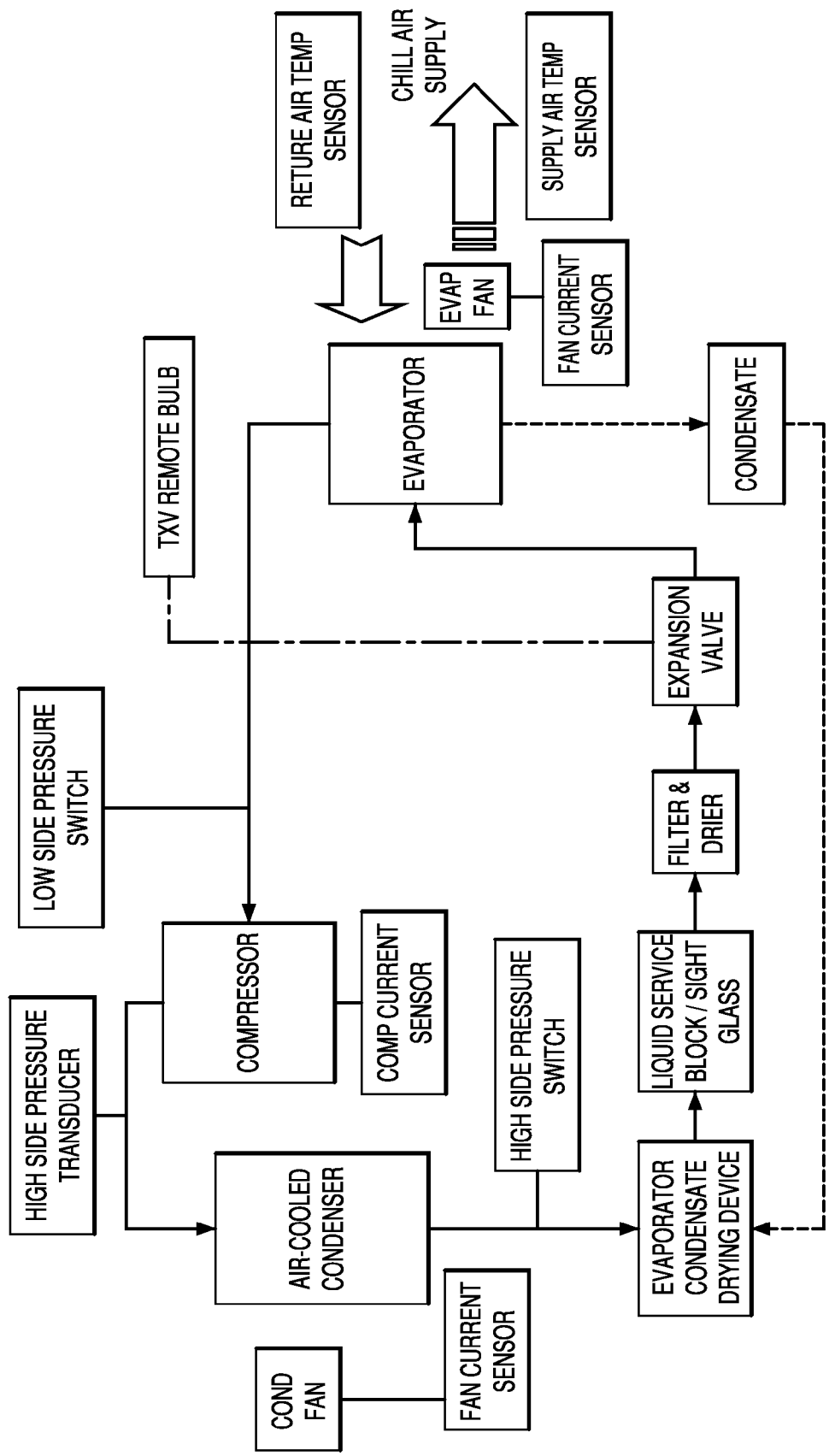
FIG. 5 is a schematic diagram of the refrigeration and condensate drying cycles used in an embodiment of the chiller.

As described in FIG. 5, after the liquid refrigerant exits the condenser 28, it preferably passes through a service block containing a sight glass (not shown) and a filter/drier assembly (not shown). The refrigerant then passes through an expansion valve 42. The sudden decrease in pressure across the expansion valve 42 causes flash evaporation of a portion of the liquid refrigerant. The cold liquid/vapor mixture moves through the refrigerant tubing 34 to the evaporator 22.

As the cold refrigerant moves through the evaporator 22, it lowers the temperature of the evaporator fins 44, cooling the air around the fins. The transfer of thermal energy converts the refrigerant to vapor. The cooled air 46 is then exhausted by evaporator fan 24 into the space in which the chiller is located. As chilled air is exhausted, warm return air is drawn into the first chamber 16 through an air inlet 48, located in the housing 12 and preferably adjacent to the evaporator 22, as shown in FIG. 2.

When the warm return air passes over the cold surface of the evaporator 22, moisture in the air condenses on the evaporator in the form of condensate 50. In typical refrigeration applications, this condensate is drained from the system and discarded. In the present invention, however, the condensate flows to condensate drain 52. From the drain 52, the condensate flows into condensate drain tubing 36. The condensate 50 then exits the drain tube 36 at a point proximate the high-temperature/high-pressure section 38 of the refrigerant tubing 34. In a preferred embodiment, the condensate temperature is approximately 33-40 degrees Fahrenheit, and the temperature of the refrigerant tubing is 20-35 degrees Fahrenheit above ambient temperature. When the condensate 50 contacts the section 38, it cools the hot refrigerant vapor therein, effectively pre-cooling the refrigerant vapor and increasing the effectiveness of the condenser. In addition, because of the high temperature of the section 38, the condensate is vaporized and may be exhausted with the condenser air 31 from the housing by condenser fan 30. This effectively eliminates the need for use of a drain port or drain plumbing to drain the condensate from the chiller housing, allowing the chiller to become portable.

When in operation, the chiller 10 is placed inside a particular galley cart (not shown) in which food product that needs to be chilled below room temperature is stored. The chiller may be connected to the galley cart's own power system, or may be operated by battery power or the galley's DC power system which is supplied by the aircraft's DC power supply. Should a flight attendant desire to move the galley cart with the chiller onboard, power to the chiller may be maintained by a battery separate from the chiller. This allows an individual cart to be chilled, thereby reducing the amount of power needed to maintain the food product at a desired temperature.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It will be apparent to those skilled in the art that various modifications and variations can be made in the configuration of the present invention without departing from the spirit or scope of the invention. It is intended that the present invention cover such modifications and variations provided they come within the scope of the appended claims or their equivalents.

What is claimed is:

1. A portable air chiller, the chiller comprising:
   a housing;
   a refrigeration system located inside the housing, the system including a compressor, a condenser, an evaporator, and refrigerant tubing adapted to transport refrigerant through the system; and
   an evaporator condensate drying device, the device including a condensate drain arranged to collect condensate from the exterior of the evaporator and route the condensate to a location within the housing proximate a point where the refrigerant tubing exits the condenser, the condensate drain including an exit placed such that the condensate exiting the drain contacts the refrigerant tubing at at least one point proximate the point where the refrigerant tubing exits the condenser.

2. The chiller of claim 1, wherein the contact between the condensate and the refrigerant tubing transfers thermal energy from the refrigerant to the condensate.

3. The chiller of claim 2, wherein the transfer of thermal energy to the condensate vaporizes the condensate.

4. The chiller of claim 3, wherein the condensate vapor is exhausted from the housing.

5. A portable air chiller, the chiller comprising:
   a housing;
   a refrigeration system located inside the housing, the system including a compressor, a condenser, an evaporator, and refrigerant tubing adapted to transport refrigerant through the system; and
   an evaporator condensate drying device, the device including a condensate drain arranged to collect condensate from the exterior of the evaporator and route the condensate to a location within the housing proximate a point where the refrigerant tubing exits the condenser, wherein the housing is divided into a first and a second compartment by a divider, and wherein the condensate drain passes through the divider.

6. The chiller of clam 5, wherein:
   the evaporator is located in the first compartment;
   the condenser is located in the second compartment; and
   the condensate drain is arranged so as to direct substantially all the condensate through the drain.

7. The chiller of claim 6, wherein the first compartment includes an inlet arranged to allow return air into the compartment and a fan arranged to exhaust chilled air from the compartment.

8. The chiller of claim 1, wherein the compressor is powered by direct electrical current.

9. An air chiller, the chiller comprising:
  a housing including a first and a second chamber, separated by a divider;
  a series of components located inside the chambers, including a compressor, a condenser, and an evaporator;
  tubing connecting the components to one another, the tubing designed to transport refrigerant therebetween; and
  a condensate drain passing through the divider so as to allow condensate to move through the drain from the first chamber to the second chamber, wherein the drain is positioned so as to direct the condensate to a point proximate a point on the tubing proximate the condenser.

10. The chiller of claim 9, wherein the compressor is powered by direct electrical current.

11. The chiller of claim 9, further comprising an expansion valve and wherein the point on the tubing proximate the condenser is between the condenser and the expansion valve.

12. The chiller of claim 9, wherein the condensate is contained within the housing and not drained therefrom in liquid form, and wherein the condensate is vaporized proximate the point on the tubing proximate the condenser and the condensate vapor is exhausted from the housing.

13. The chiller of claim 9, wherein the first chamber includes an inlet arranged to allow return air into the first chamber and a fan arranged to exhaust chilled air from the first chamber.

14. The chiller of claim 9, wherein the first chamber is located above the second chamber.

15. The chiller of claim 1, wherein the chiller does not include a drain through which condensate exits the housing.

16. The chiller of claim 1, further comprising an expansion valve and wherein the condensate contacts the refrigerant tubing at at least one point proximate a point where the refrigerant tubing exits the condenser between the condenser and the expansion valve.

17. The chiller of claim 5, wherein the condensate is contained within the housing and not drained therefrom in liquid form, and wherein the evaporator condensate drying device vaporizes the condensate and the condensate vapor is exhausted from the housing.

18. The chiller of claim 6, wherein the first compartment is located above the second compartment.

19. A portable air chiller, the chiller comprising:
  a housing;
  a refrigeration system located inside the housing, the system including a compressor, a condenser, an evaporator, and refrigerant tubing adapted to transport refrigerant through the system; and
  an evaporator condensate drying device, the device including a condensate drain arranged to collect condensate from the exterior of the evaporator and route the condensate to a location within the housing such that substantially all of the condensate is vaporized.

20. The chiller of claim 19, wherein the condensate exits the condensate drain and contacts the refrigerant tubing at at least one point proximate the point where the refrigerant tubing exits the condenser and wherein transfer of thermal energy from the refrigerant tubing to the condensate vaporizes the condensate.

\* \* \* \* \*